United States Patent
Kato

(10) Patent No.: US 6,456,613 B1
(45) Date of Patent: Sep. 24, 2002

(54) DIRECT COMMUNICATION METHOD BETWEEN SLAVE UNITS AND PHS TERMINAL FOR DIRECT COMMUNICATION BETWEEN PHS SLAVE UNITS

(75) Inventor: Makibi Kato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/312,853

(22) Filed: May 17, 1999

(30) Foreign Application Priority Data

May 26, 1998 (JP) .......................................... 10-143649

(51) Int. Cl.[7] .............................. H04Q 7/20; H04Q 7/32
(52) U.S. Cl. ...................... 370/347; 370/337; 370/350; 370/442; 370/349; 455/517; 455/550; 455/557
(58) Field of Search ................................ 370/337, 347, 370/350, 442, 503, 349; 455/509, 517, 502, 426, 550, 556, 557, 526, 422, 424, 425, 403

(56) References Cited

U.S. PATENT DOCUMENTS 5,212,809 A * 5/1993 Oka ............................ 455/557
5,515,366 A * 5/1996 Chieu et al ................. 370/337
5,907,794 A * 5/1999 Lehmusto et al. .......... 455/509
5,995,500 A * 11/1999 Ma et al. .................... 370/337
6,289,218 B1 * 9/2001 Liu ............................. 370/337

* cited by examiner

Primary Examiner—William Trost
Assistant Examiner—Keith Ferguson
(74) Attorney, Agent, or Firm—Venable; Robert J. Frank

(57) ABSTRACT

A PHS terminal has a PHS slave unit and data processing equipment connected to the PHS slave unit for data communication. The PHS terminal includes a continuous slot forming circuit for continuously forming, at least at the time of direct communication between the PHS slave unit and the other PHS slave unit, a desired number of consecutive slots in a TDMA frame. An identification message forming circuit forms, when the PHS terminal calls the other PHS terminal including the other PHS slave unit, a message for informing the other PHS terminal of whether the PHS terminal to which the circuit belongs is a server or a client. A callback control circuit automatically redials if the message shows that the other PHS terminal originated a call is a client. A reserve message forming circuit forms, based on the quantity of data to send, a reserve message representative of the number of slots to reserve in one frame. A number-of-slot setting circuit compares, on receiving the reserve message, the number of reserve slots represented by the reserve message and the number of reserve slots of the PHS terminal to which the circuit belongs, and sets, based on the result of comparison, the number of slots to be sent from the PHS terminal for a frame in the continuous slot forming circuit.

19 Claims, 7 Drawing Sheets

COMMUNICATION SLOT

| BIT / OCTET | 8 | 7 | 6 | 5 | 4 | 3 | 2 | 1 |
|---|---|---|---|---|---|---|---|---|
| 1 | NUMBER OF RESERVE SLOTS ||||||||
| 2 | NUMBER OF RESERVE SLOTS ||||| PRIORITY |||

DIRECT COMMUNICATION METHOD BETWEEN SLAVE UNITS AND PHS TERMINAL FOR DIRECT COMMUNICATION BETWEEN PHS SLAVE UNITS

BACKGROUND OF THE INVENTION

1. Field of the Invention

The present invention relates to a direct communication method between slave units and a PHS (Personal Handy-Phone System) terminal for direct communication between PHS slave units. More particularly, the present invention relates to a direct communication method between slave units and a PHS terminal for direct communication between PHS slave units advantageously applicable to data communication between a client and a server.

2. Description of the Background Art

PHS allows a cordless phone to be used both inside and outside of a building. Today, data communication services implementing data communication between PHS slave units to which computers or similar data equipment are connected are spreading. Further, PHS slave units are capable of directly communicating with each other without the intermediary of master units.

To allow two PHS slave units to interchange data by direct communication, it has been customary for each of the slave units to transmit one slot for a frame and then receive one slot for a frame and to interchange data at the same rate as each other. This kind of data communication accords to, e.g., RCR STD-28 which is a PHS standard (Second Generation Cordless Phone System Standard, First Edition) prescribed by ARIB (Association of Radio Industries and Business).

In accordance with the above standard, 5 ms long TDMA (Time Division Multiple Access) frames each are divided into eight so as to allocate four channels to each of an up-link and a down-link. On each of the up-link and down-link, one of the four channels is used as a control slot while the other three channels are used as communication slots. Communication can therefore be held via up to three channels at the same time. The maximum communication rate is 32 kbps for a channel.

However, the conventional technology described above has a problem ascribable to the fact that the up-link and down-link have the same transmission rate, as follows. When the up-link and down-link are noticeably different in the quantity of data to send, transmission efficiency is lowered. For example, assume that a file server or similar data equipment is connected to one PHS slave unit while client's data equipment is connected to the other PHS slave unit, and that file transfer or similar data communication is held between the two slave units. Then, file transfer from the server to the client is predominant, lowering the total transmission efficiency of the system including the up-link and down-link. Further, when files include, e.g., pictures represented by a great quantity of data, it is desirable to further increase the transfer rate in order to reduce the communication time.

SUMMARY OF THE INVENTION

It is therefore an object of the present invention to provide a direct communication method between slave units capable of increasing the transmission rate of at least one of an up-link and a down-link to thereby effect asymmetrical data communication which increases the total transmission efficiency of a system when quantities of data on the up-link and down-link increase, and a PHS terminal having such a capability.

In accordance with the present invention, a method of allowing two PHS slave units respectively connected to two data equipment for data communication to directly communicate with each other via radio channels of TDMA frames begins with the step of connecting one data equipment functioning as a server for data communication to one PHS slave unit, and connecting the other data equipment functioning as a client to the other PHS slave unit. The PHS slave unit of the server is caused to originate a call addressed to the PHS slave unit of the client via a desired communication channel and thereby sets up synchronization between the PHS slave units with respect to an up-link and a down-link via the communication channel. Among m communication slots of a TDMA frame, n (natural number of 1 to m) consecutive communication slots continuing from a slot of the communication channel used for synchronization is set on at least the down-link extending from one of the PHS slave units to the other PHS slave unit. The PHS slave terminals are caused to interchange data at asymmetrical rates with respect to the up-link and the down-link in respective TDMA frames by respectively using some of the n slots and some of (m−n) slots.

Also, in accordance with the present invention, a PHS terminal has a PHS slave unit and data equipment connected to the PHS slave unit for data communication. The PHS terminal includes a continuous slot forming circuit for continuously forming, at least at the time of direct communication between the PHS slave unit and the other PHS slave unit, a desired number of consecutive slots in a TDMA frame. An identification message forming circuit forms, when the PHS terminal calls the other PHS terminal including the other PHS slave unit, a message for informing the other PHS terminal of whether the PHS terminal to which the circuit belongs is a server or a client. A callback control circuit automatically redials if the message shows that the other PHS terminal originated a call is a client. A reserve message forming circuit forms, based on the quantity of data to send, a reserve message representative of the number of slots to reserve in one frame. A number-of-slot setting circuit compares, on receiving the reserve message, the number of reserve slots represented by the reserve message and the number of reserve slots of the PHS terminal to which the circuit belongs, and sets, based on the result of comparison, the number of slots to be sent from the PHS terminal for a frame in the continuous slot forming circuit.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
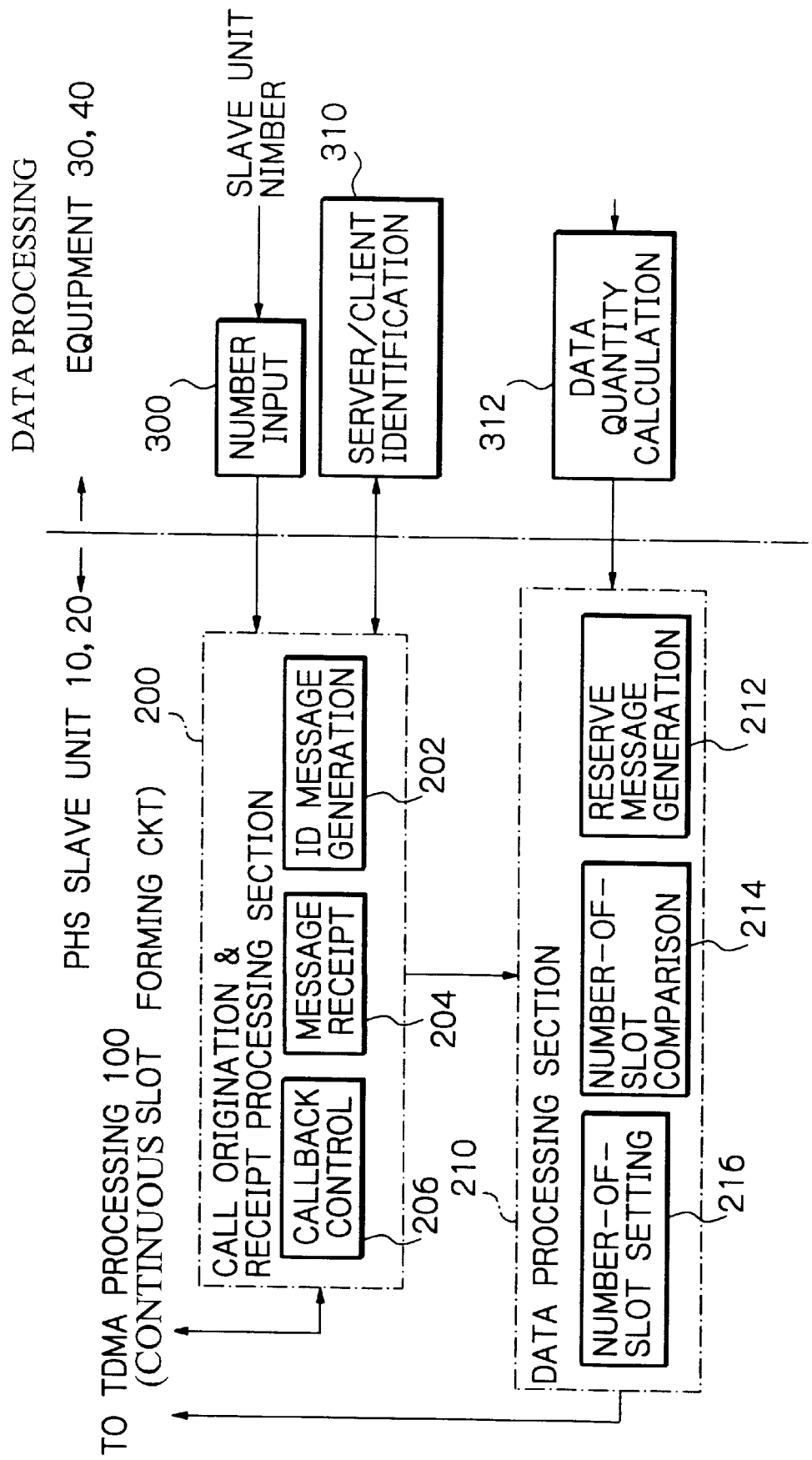
FIG. 1 is a block diagram schematically showing a PHS terminal embodying the present invention.
Figure 2:
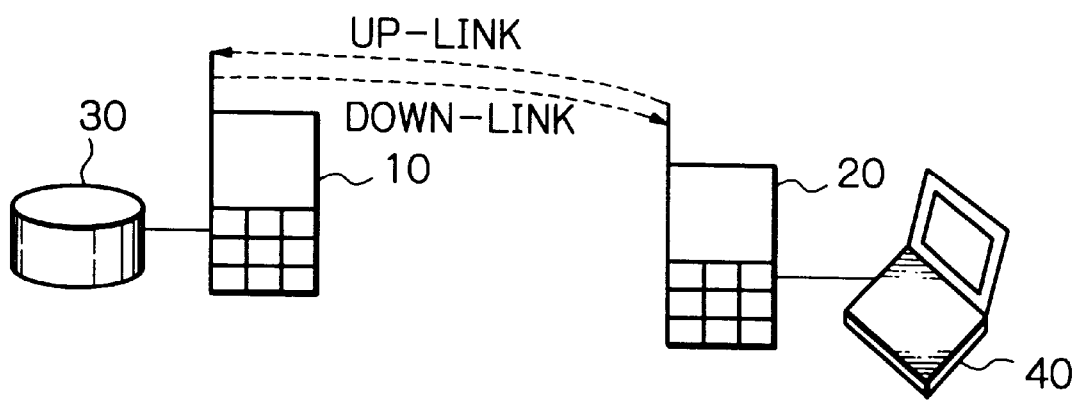
FIG. 2 shows the concept of direct communication between slave units to which the illustrative embodiment is applied.

Referring to FIG. 1 of the drawings, a PHS terminal to which a direct communication method embodying the present invention is applied is shown. The PHS terminal to be described is a data communication apparatus to which a computer or similar data equipment for data communication is connected. FIG. 2 shows a specific system including two PHS slave units 10 and 20 to which a file server or similar data equipment 30 and client's data equipment capable of accessing the file server are respectively connected. The slave units 10 and 20 are capable of directly communicating with each other without the intermediary of a base station or a PHS master station, implementing efficient data communication between the server and the client. The PHS terminal shown in FIG. 1 may include either one or such slave units 10 and 20.

Particularly, at the time of direct communication, the illustrative embodiment causes each of the slave units 10 and 20 to continuously form some of six communication slots of a TDMA frame and send them to the other slave unit. A greater number of communication slots are allocated to, e.g., a down-link transferring a great amount of data from the server to the client than to an up-link transferring data from the client to the server. The illustrative embodiment therefore implements asymmetrical data communication between the down-link and the up-link.

Figure 3:
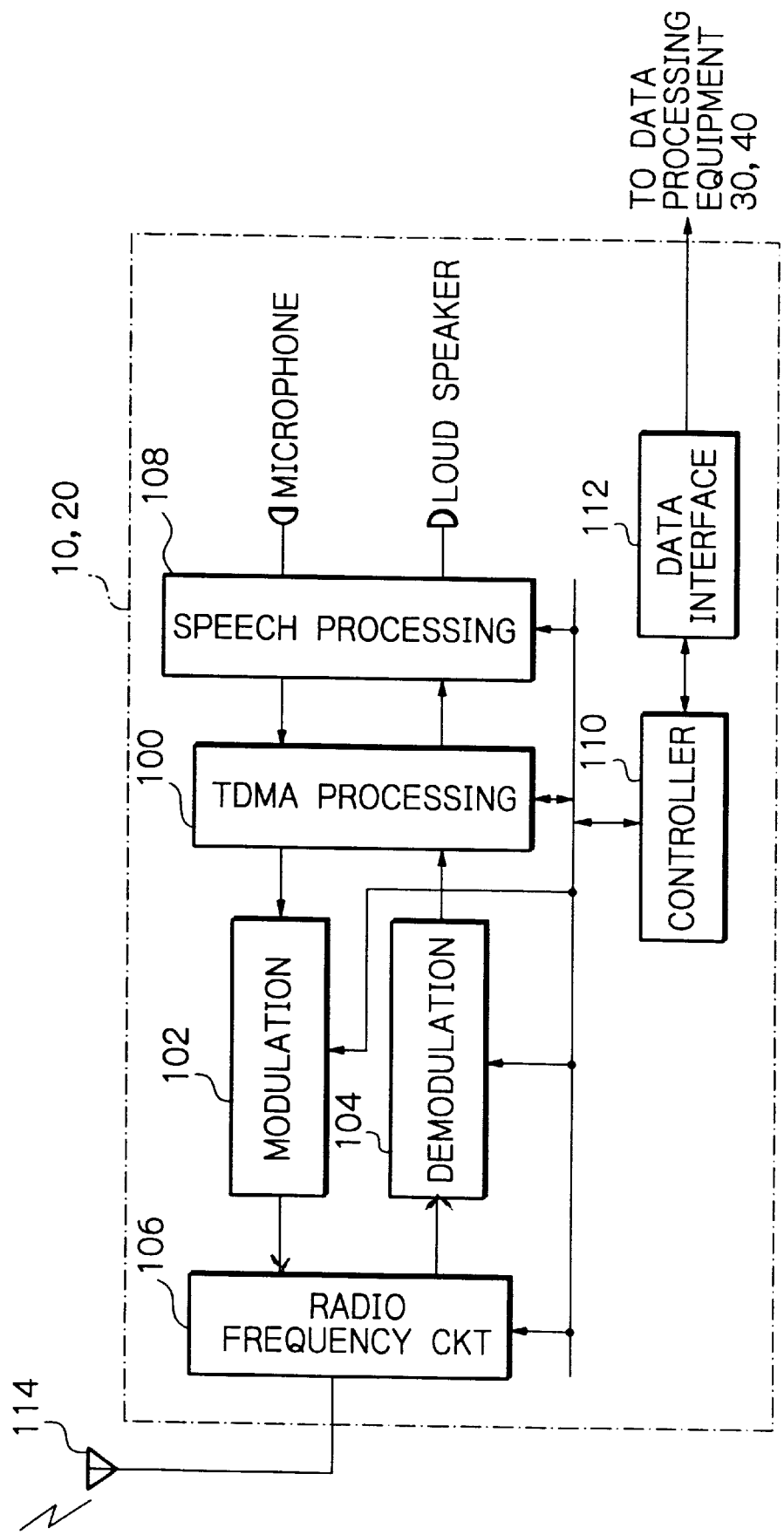
FIG. 3 is a schematic block diagram showing a specific configuration of a PHS slave unit included in the PHS terminal shown in FIG. 1.

FIG. 3 shows a specific hardware configuration of each of the PHS slave units 10 and 20. The slave units 10 and 20 are PHS mobile stations capable of interchanging speech or interchanging data when connected to the data processing equipment 30 and 40, respectively. As shown in FIG. 3, the slave units 10 and 20 each includes a TDMA processor 100, a modulator 102, a democulator 104, a radio frequency circuit 106, a speech processor 108, a controller 110, and a data interface 112. Hereinafter, the TDMA processor 100, the modulator 102, the demodulator 104 and the speech processor 108 are referred to as TDMA processing 100, modulation 102, demodulation 104 and speech processing 108.

The TDMA processing 100 (continuous slot forming circuit) constructs speech codes output from the speech processing 108 or data and a control message output from the controller 110 into slots or reconstructs original codes or data from received slots. Particularly, at the time of direct communication between the slave units 10 and 20, the TDMA processing 100 is capable of continuously generating or restoring, under the control of the controller 110, one to six TDMA slots at a preselected timing frame by frame.

Figures 4, 5:
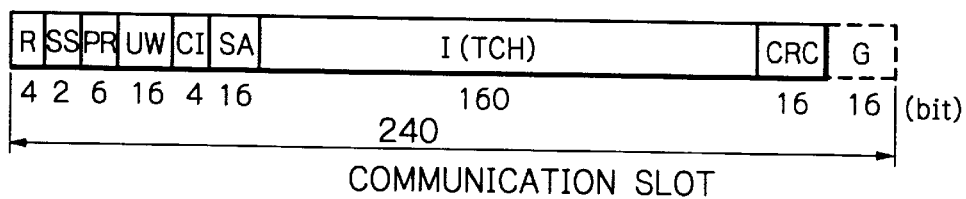
FIG. 4 shows a specific format of a communication slot applicable to the illustrative embodiment.
FIG. 5 shows a specific format of a slow associated control channel also applicable to the illustrative embodiment.

A specific format of one TDMA slot is shown in FIG. 4. As shown, the TDMA slot is made up of four-bit ramp time (R) for a transitional response, a two-bit start symbol (SS), a six-bit preamble (PR), a sixteen-bit synchronizing word (UW), a four-bit channel identification (CI), a sixteen-bit slow associated control channel (SA), a 160-bit information channel I (TCH (Traffic Channel)), a sixteen-bit error correction code (CRC (Cyclic Redundancy Check) code), and sixteen guard bits (G). The channel identification CI and slow associated control channel SA are fed from the controller 110. The information channel I is fed from the speech processing 108 in the case of a speech code or fed via the controller 110 in the case of data.

Referring again to FIG. 3, the modulation 102 modulates a slot received from the TDMA processing 100 with the frequency of a desired channel. In the illustrative embodiment, the modulation 102 may advantageously be implemented by a π/4 shift QPSK (Quadrature Phase Shift Keying) system. For example, ten frequency channels selected from 1.895 GHz to 1.898 GHz are allocated to direct communication between slave units. In the illustrative embodiment, the modulation 102 modulates each slot with any one of the above ten frequency channels, depending on the surrounding conditions.

The demodulation 104 demodulates slots addressed to the slave unit 10 or 20 and may advantageously be implemented by a quadrature delay detector capable of effectively demodulating π/4 shift QPSK signals. In the illustrative embodiment, the demodulation 104 shares, e.g., a frequency synthesizer with the modulation 102 in order to effect switching to the same frequency as the modulation 102.

The radio frequency circuit 106 is made up of a transmitting circuit and a receiving circuit, although not shown specifically. The transmitting circuit amplifies TDMA slots fed from the modulation 102 with respect to radio frequency and sends the amplified slots via an antenna 114. The receiving circuit receives, among TDMA frames coming in through the antenna 114, only frequency channels addressed to the slave unit 10 or 20.

The speech processing 108 is connected to a transmitter/receiver including a microphone and a speaker. The speech processing 108 includes a coder for coding an input speech signal by efficient coding and a decoder for decoding a received speech code.

The controller 110 is implemented by a CPU (Central Processing Unit) for controlling the above circuits 100–108 for the generation of a message at the time of call origination or receipt of a call, timing processing, etc. In the illustrative embodiment, the controller 110 includes a call origination and receipt processing section and a data processing section, as will be described specifically later. The data processing section executes preselected processing with data received from the data processing equipment 30 or 40.

The data interface 112 interfaces the slave unit 10 or 20 to the data processing equipment 30 or 40. The data interface 112 includes a connecting section for connecting the slave unit 10 or 20 to the data processing equipment 30 or 40 and a UART (Universal Asynchronous Receiver-Transmitter) or similar protocol processing section, although not shown specifically. The connecting section is removably connected to a serial line, e.g., RS232C. The protocol processing section processes a communication protocol for asynchronous serial data.

The slave unit 10 and server's data processing equipment 30 connected together and the slave unit 10 and client's data processing equipment 40 connected together each constitute the PHS terminal of the illustrative embodiment. Briefly, as shown in FIG. 1, the controller 110 of the slave unit 10 or 20 and communication software installed in the associated data processing equipment 30 or 40 cooperate to implement data communication unique to the illustrative embodiment.

Specifically as shown in FIG. 1, the communication software of each of the data processing equipment 30 and 40 includes a number input unit 300, a server/client identification circuit 310, and a data quantity calculator 312, hereinafter referred to as a number input 300, a server/client identification 310 and a data quantity calculation 312. The controller 110 of each of the slave units 10 and 20 includes a call origination and receipt processing section 200 and a data processing section 210. The number input 300 sends a slave unit number input on, e.g., a keyboard on occasion or beforehand to the slave unit 10 or 20. Particularly, in the illustrative embodiment the number input 300 adds to the slave unit number an identification (ID) code showing whether the PHS terminal to which it belongs is a server or a client.

The server/client identification 310 determines, based on a received message fed from the associated slave unit 10 or 20, whether the data processing equipment 30 or 40 connected to the remote slave unit 10 or 20 belongs to a server or to a client. If the data processing equipment including the server/client identification 310 is a server, then the identification 310 sends a callback command to the slave unit 10 or 20 connected to the data processing equipment.

The data quantity calculation 312 determines the quantity of data to be sent from the PHS terminal including it and informs the associated slave unit 10 or 20 of the quantity of data. For example, the calculation 312 searches for a file designated by the other PHS terminal and calculates the quantity of data of the file. In addition, in the illustrative embodiment, the calculation 312 should preferably add a code representative of a priority degree to the quantity of data, depending on whether priority should be given to data transmission or to data receipt. The priority degree is fed from the calculation 312 to the associated slave unit 10 or 20 together with the quantity of data.

The call origination and receipt processing section 200 executes call origination processing in response to a slave unit number input on the associated data processing equipment 30 or 40 or executes preselected processing in the event of call incoming. Particularly, in the illustrative embodiment, the processing section 200 includes an ID message generator 202, a message receipt unit 204, and a callback control circuit 206, hereinafter called the ID message generation 202, a message receipt 204 and callback control 206. The ID message generation 202 generates, at the time of call origination, a message showing whether the terminal including it is a server or a client. The message receipt 204 decodes a message received from the other terminal and then executes preselected control or transfers the message. In response to the callback command mentioned earlier, the callback control 206 once disconnects the link and calls back a slave unit designated by the command.

The data processing section 210 transfers data input from the associated data processing equipment 30 or 40 to the TDMA processing 100, FIG. 3. In the illustrative embodiment, the data processing section 210 includes a reserve message generation circuit 212, a number-of-slot comparator 214, and a number-of-slot setting circuit 216, hereinafter the reserve message generation 212, number-of-slots comparison 214 and number of slots setting 216. The reserve message generation 212 generates, at the time of call origination and call incoming, a message representative of a number of reserve slots corresponding to the quantity of data. The number-of-slot comparison 214 compares a number of reserve slots received from the remote terminal and a number of reserve slots generated by the reserve message generation 212. The number-of-slot setting sets a number of slots in the TDMA processing 100 on the basis of the result of a comparison output from the number-of-slot comparison 214.

For example, as shown in FIG. 5, the reserve message generation 212 may advantageously set in the sixteen-bit slow associated control channel SA, FIG. 4, a number of reserve slots and a priority degree represented by fourteen bits and two bits, respectively. The priority order is "0" when priority is given to receipt, "1" in a usual condition, or "2" when priority is given to transmission. Considering the result of the comparison output from the number-of-slot comparison 214 and priority degree, the number-of-slot setting 216 first gives priority to the number of slots having a higher priority degree, then gives priority to a greater number of slots, and gives priority to the server's number of slots when the priority degrees are equal and if the number of slots are also equal. The setting 216 may advantageously set the number of reserve slots sent if priority is given to the terminal to which it belongs or set the number of slots remaining when the other terminal's number of slots is subtracted from six slots if priority is not given to the above terminal.

Figure 6:
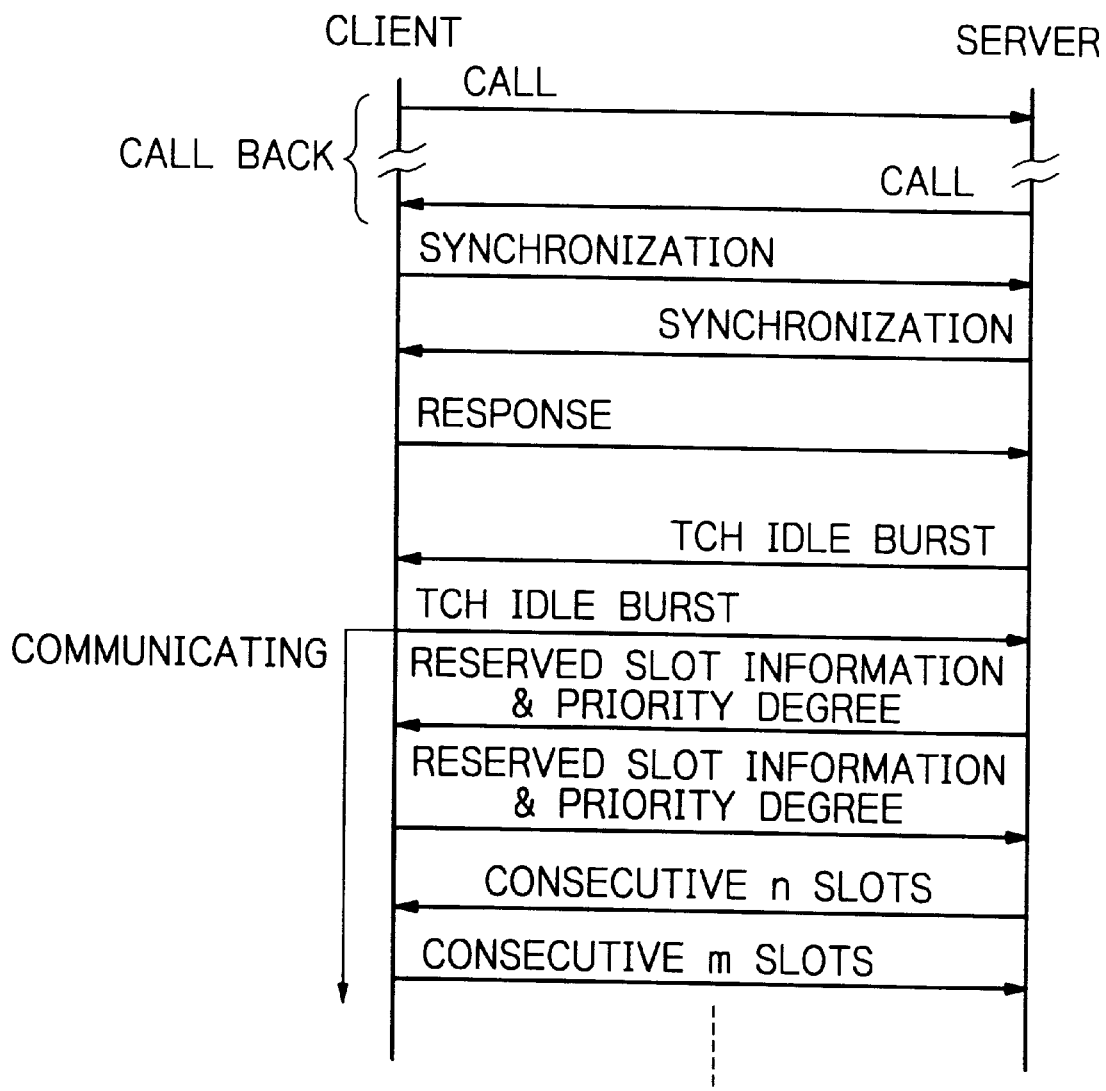
FIG. 6 is a chart demonstrating a specific direct communication sequence practicable with the illustrative embodiment.

Reference will be made to FIG. 6 for describing a specific direct communication sequence between the PHS slave units 10 and 20 available with the illustrative embodiment. Before the beginning of the sequence, the server's data processing equipment 30, for example, is connected to the PHS slave unit 10 while the client's data processing equipment 40 is connected to the other PHS slave unit 20. The operator at either one of the two PHS terminals shown in FIG. 2 inputs a number assigned to the remote slave unit 10 or 20 on the data processing equipment 30 or 40 belonging to the terminal. Alternatively, the operator may select a slave unit number registered beforehand and then originate a call.

Assume that a call addressed to the server's terminal including the slave unit 10 is originated at the client's terminal including the slave unit 20. Then, a number assigned to the slave unit 10 is fed from the data processing equipment 40 to the slave unit 20. In response, the controller 110 included in the slave unit 20 generates a call message. At this instant, the controller 110 adds to the call message an ID code representative of the client's terminal as distinguished from the server's terminal. The call message with the ID code is fed to the TDMA processing 100.

The TDMA processing 100 formats the call message in a communication slot at a preselected timing. The modulation 102 modulates the call message formatted by the TDMA processing 100 by using a frequency channel assigned to direction communication between slave units. The radio frequency circuit 106 sends the modulated call message to the server's slave unit 10 via the antenna 114.

At the server's slave unit 10, the radio frequency circuit 106 receives the call message from the slave unit 20 via the antenna 114. The demodulation 104 demodulates the received message by using the frequency channel assigned to direct communication and delivers the demodulated message to the TDMA processing 100. The TDMA processing 100 separates the message from the communication slot and feeds it to the controller 110. The controller 110 decodes the message so as to pick up the ID code of the terminal originated the call. The ID code is fed from the controller 110 to the data processing equipment 30.

The data processing equipment 30 determines, based on the ID code, that the terminal originating the call is a client's terminal, and then delivers a callback command to the slave unit 10. In response, the slave unit 10 once disconnects the link and produces a call message from the number of the client's save unit 20. On the disconnection o the link, the client's slave unit 20 is restored to a stand-by state.

The call message generated in the server's slave unit 10 is also formatted in a slot, modulated by the frequency channel for direct communication, and then sent to the client's slave unit 20 to call it back.

On receiving the call message, the client's terminal starts preselected call incoming processing. For example, the slave unit 20 generates a synchronizing slot and sends it to the server's slave unit 10 at a time later than the receipt of the call slot by half a frame.

When the slave unit 10 receives the above synchronizing slot, it also generates a down-link synchronizing slot at a preselected timing and sends it to the slave unit 20. As a result, frame synchronization is set up. Subsequently, the slave unit 20 generates a response message and sends it to the slave unit 10.

On receiving the response message, the slave unit 10 generates, e.g., a preselected idle burst of the information channel for setting up bit synchronization and sends it to the slave unit 20. When the slave unit 20 receives the idle burst via the down-link, it also generates an idle burst and sends the idle burst to the slave unit 10 via the up-link. Consequently, synchronization of the order of bits is set up between the two idle units 10 and 20.

Subsequently, the data processing equipment 30 and 40 each deliver a command representative of a particular amount of data to send and a particular priority degree to the associated slave unit 10 or 20. In response, the slave units 10 and 20 each generate a reserve message, formats it in the slow associated control channel SA, FIG. 4, and feeds the formatted reserve message to the TDMA processing 100.

First, the server's slave unit 10 forms a communication slot including the reserve message and sends it to the client's slave unit 20. On receiving the communication slot, the slave unit 20 also forms a communication slot including a reserve message relating to the client's terminal and sends it to the slave unit 10.

The controller 110 included in each of the slave units 10 and 20 detects the reserve message received. Then, the number-of-slot comparison 214 compares the number of reserved slots of the associated terminal and the number of reserve slots of the other terminal and feeds the result of comparison to the number-of-slot setting 216. The number-of-slot setting 216 sets, based on the result of comparison and priority degrees, the number of slots to be allocated to the associated terminal and sets it in the TDMA processing 100.

Specifically, assume that the number of slot reserved by the server and the number of slots reserved by the client are "5" and "3" respectively, and that the server and client have the same priority degree. Then, "5" and "1" are respectively set at the server's terminal and client's terminal as the numbers of slots. In this case, if the client has a higher priority degree than the server, then "3" is set at both of the server's terminal and client's terminal as the numbers of slots. On the other hand, when the numbers of reserve time slots are both "4" and if the priority degrees are the same, then "4" and "2" are respectively set at the server's terminal and client's terminal with priority given to the server's terminal.

By the above procedure, among six communication slots, n slots and m slots are allocated to the server's terminal and client's terminal, respectively. The numbers n and m are respectively set in the TDMA processing 100 of the server's terminal and client's terminal. Then, data communication starts with data sequentially fed from the data processing equipment 30 and 40 to the slave units 10 and 20, respectively.

First, at the server's terminal, the data processing equipment 40 feeds n slots of data to the controller 110 of the slave unit 10. The controller 110 sequentially divides the n slots of data into segments each having the number of bits of the information channel TCH of each slot. The TDMA processing 100 constructs the data of such different information channels TCH into communication slots, thereby forming n consecutive communication slots. Of course, if a control slot transmission timing exists between the server's terminal and a base station, the formation of the above communication slots will be delayed by the control slot transmission timing. The communication slots are sequentially modulated by the modulation 102 using the frequency channels assigned to direction communication between slave units, amplified by the radio frequency circuit 106, and then sent via the antenna 114.

At the client's terminal, the radio frequency circuit 106 of the slave unit 20 receives the consecutive slots via the antenna 114. The demodulation 104 sequentially demodulates the slots input from the radio frequency circuit 106 while feeding the demodulated slots to the TDMA processing 100. The TDMA processing 100 separates the data from the information channels TCH of the slots and delivers them to the controller 110. The controller 110 transfers the data to the data processing equipment 40 via the interface 112. As a result, the data are written to, e.g., a memory included in the data processing equipment 40.

After the receipt of the n consecutive slots form the server's terminal, the client's slave unit 20 receives data from the associated data processing equipment 40, constructs them into m communication slots, and then sends the communication slots via the antenna 114 in the same manner as the server's slave unit 10.

Subsequently, the server again sends n consecutive slots in the respective TDMA frames, and then the client sends m consecutive slots using the respective TDMA frames. In this manner, data communication is executed at a particular rate (asymmetrical rate) on each of the up-link and down-link. When either one of the server's terminal and client's terminal ends sending data, it causes the associated slave unit 10 or 20 to continuously send, e.g., communication slots similar to idle bursts at the above timing until data transmission from the other terminal completes. This insures smooth communication by preserving the synchronization between TDMA frames.

When further data communication is required, the data processing equipment 30 and 40 each feeds a particular amount of data to be sent and a particular priority degree to the PHS slave unit 10 or 20, respectively. In response, the slave unit 10 or 20 again generates a reserve message based on the amount of data and sends it to the other terminal. Consequently, the slave units 10 and 20 each set in the respective TDMA processing circuit 100 a number of consecutive slots matching with the number of reserved slots and priority degree received from the other terminal. This is followed by the asymmetrical data communication described above.

Thereafter, the number of slots to be continuously sent is set file by file or data by data in the same manner in order to repeat asymmetrical data communication. At the end of the data communication, the link is disconnected; the server then waits for an access from another client.

As stated above, in the illustrative embodiment, the PHS slave units 10 and 20 each sends, based on the quantity of data to be transmitted from the associated data processing equipment 30 or 40, a number of reserve slots to be set at the other terminal. The terminal receiving the number of reserve slots sets a number of consecutive slots of its own on the basis of the number of reserve slots and priority degree received. In this condition, efficient data communication can be held between the two terminals asymmetrically with respect to the up-link and down-link. Specifically, when one of the two terminals sends a greater amount of data than the other terminal, data can be efficiently interchanged at different rates with respect to the up-link and down-link. In the illustrative embodiment, a plurality of slots are sent for each frame. Therefore, when the data rate is 32 kb/s for a single slot and if the maximum number of slots to be continuously sent is six, then the transmission rate can be increased up to 192 kb/s. It follows that a great quantity of data can be sent in a short period of time.

Figure 7:
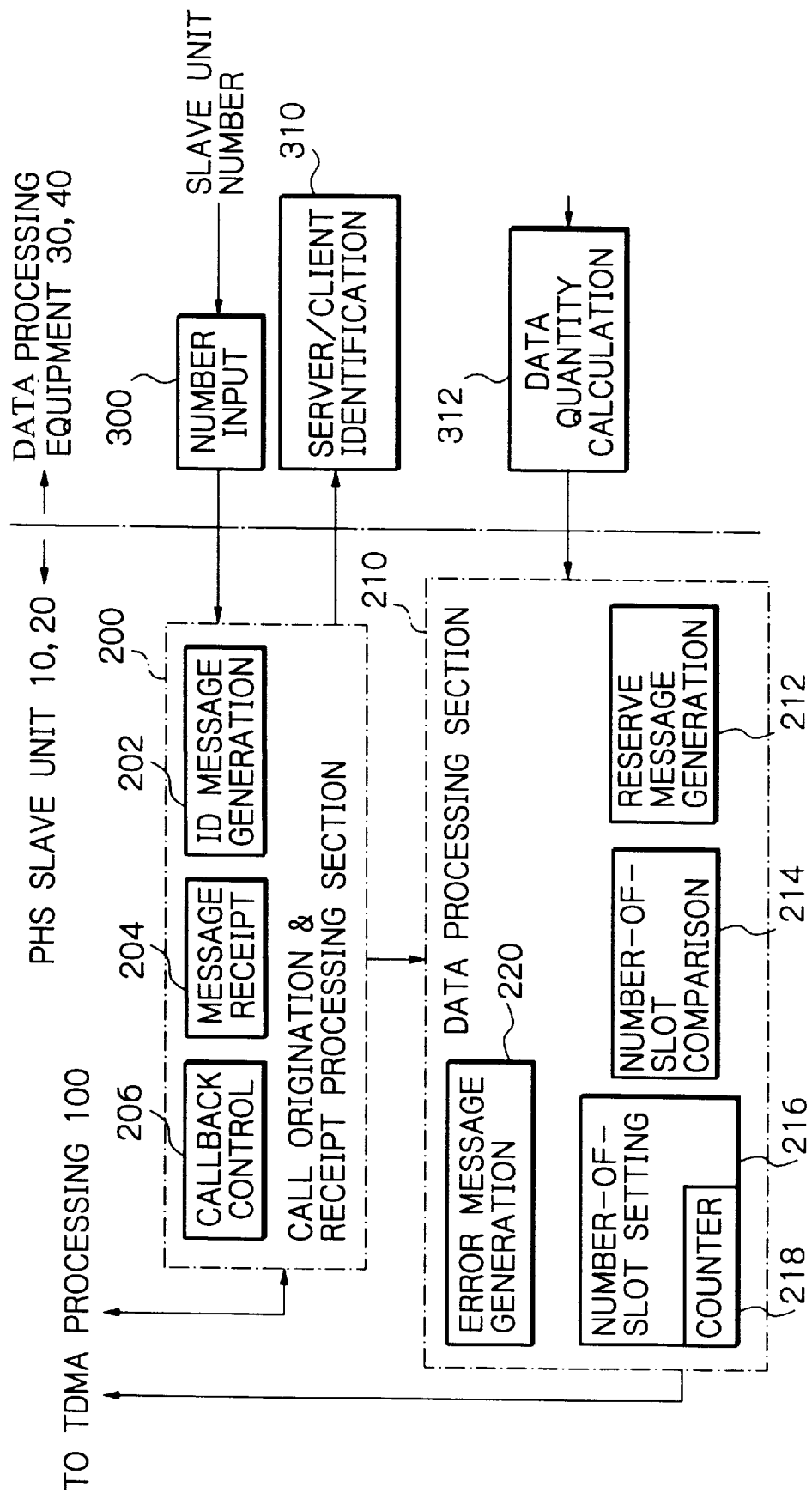
FIG. 7 is a block diagram showing an alternative embodiment of the PHS terminal in accordance with the present invention.

Referring to FIG. 7, an alternative embodiment of the PHS terminal in accordance with the present invention will be described. This embodiment is essentially similar to the previous embodiment except for the following. In FIG. 7, structural elements identical with the structural elements of FIG. 1 are designated by like references numerals, and a detailed description thereof will not be made in order to avoid redundancy.

As shown in FIG. 7, the data processing section 210 additionally includes a counter 218 built in the number-of-slot setting 216 and an error message generator 220, hereinafter, error message generation 220. The number-of-slot setting 216 first sets "1" in the counter 218 as a number of slots and then increments the counter 218 by 1 (one) for each frame up to "n" which is the maximum number of reserve slots. The number of slots being counted by the counter 218 is set in the TDMA processing 100 at the same time. The error message generating 220 generates an error message when any one of the slots received by the TDMA processing 100 includes an error, as determined on the basis of e.g., CRC bits.

Specifically, the counter 218 is an up-down counter capable of being incremented up to a number of consecutive bits to be set by the number-of-slot setting 216. In the illustrative embodiment, the counter 218 is usually incremented by 1 for each frame, but decremented by 1 on the receipt of an error report from the other terminal. The setting 216 sets the number of consecutive slots in the TDMA processing 100 frame by frame in accordance with the content of the counter 218.

When the data of received slots have an error rate greater than a preselected threshold value, the error message generation 220 generates a message for informing the other terminal of an error. For example, the error message generation 220 generates an error message on the basis of the result of error checking performed by the TDMA processing 100 on the CRC bits.

Further, in the illustrative embodiment, the message receipt 204 included in the call origination and receipt processing section 200 feeds the above error message to the counter 218 when the error message is received.

Figure 8:
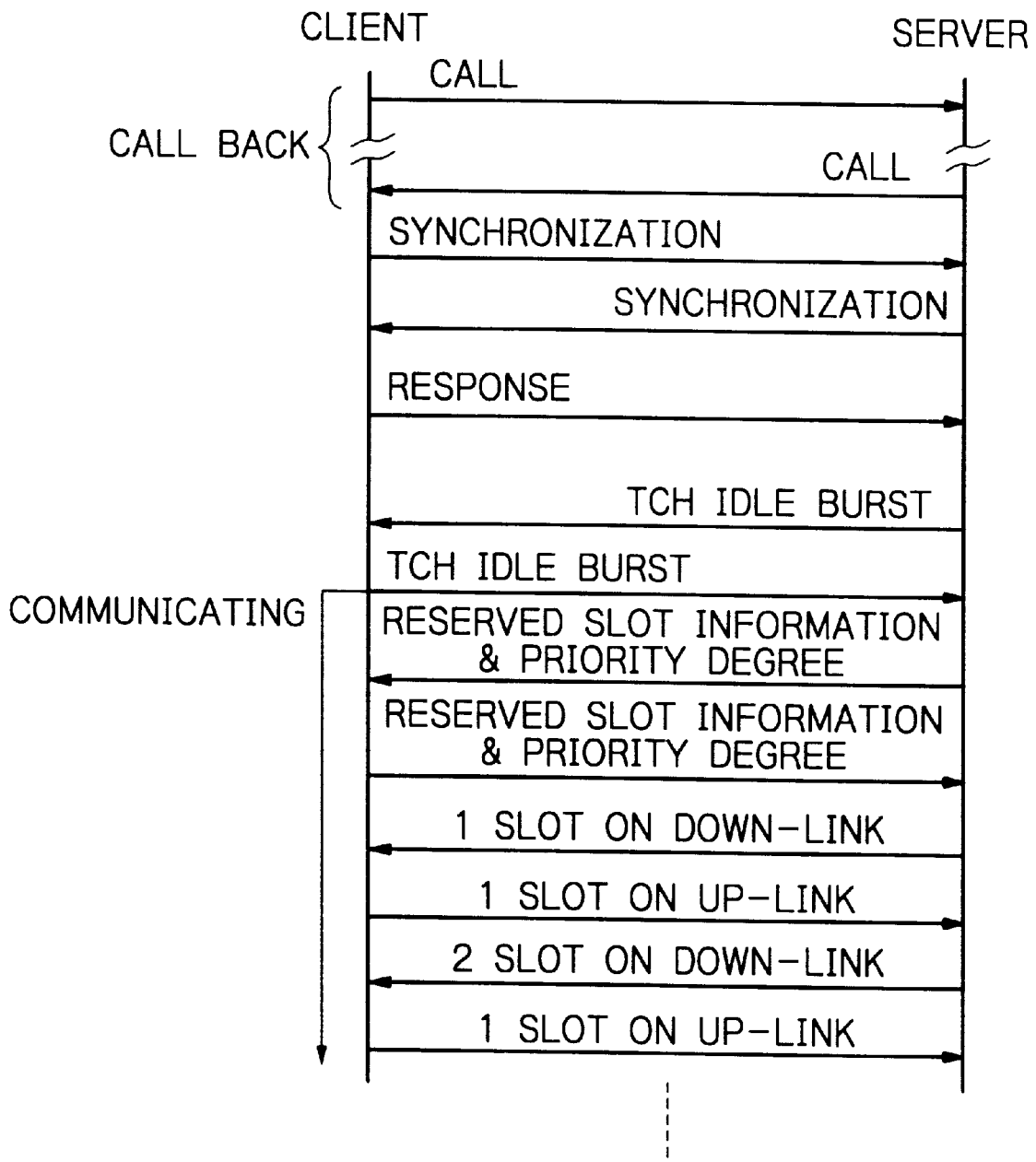
FIG. 8 is a chart representative of a specific direction communication sequence practicable with the embodiment of FIG. 7.

FIG. 8 demonstrates a specific direct communication sequence unique to this embodiment. First, by using the link extending from the server to the client as a down-link, a call is originated via a channel assigned to direct communication by, e.g., callback processing as in the first embodiment. After frame synchronization has been set up by synchronizing slots, the client sends a response slot to the server. Then the server and client send idle bursts of the information channel for setting up synchronization of the order of bits in exactly the same manner as in the previous embodiment.

Subsequently, the server and client each sends a respective reserve message including a number of slots matching with the quantity of data to send. In the illustrative embodiment, the client is expected to set at least one slot, so that the server is capable of reserving up to five slots.

The server and client received each other's reserve messages each determine a number of consecutive slots in accordance with the number of reserve slots and priority degrees, as in the previous embodiment. In this embodiment, the client is assumed to send only a small amount of data and therefore provided with only one slot, so that the server is capable of using up to five slots.

First, at the server's terminal having determined the number of slots, the data processing equipment 30 feeds data to the PHS slave unit 10. In response, the data processing section 210 delivers one slot of data to the TDMA processing 100. As a result, a single communication slot is formed in the first frame. This slot is modulated by the frequency channel for direct communication, subjected to high frequency amplification, and then sent to the client's terminal, as in the previous embodiment.

At the client's terminal, the radio frequency circuit 106 receives the slot sent from the server's station. The demodulation 104 demodulates the received slot and then feeds it to the TDMA processing 100. The TDMA processing 100 executes CRC bit error checking with the demodulated slot and sends the result of error checking to the controller 110 together with data separated from the information channel.

If the received data is free from errors, the data is fed to the data processing equipment 40 via the interface 112, as in the previous embodiment. If any data should be sent from the client's terminal, the data processing equipment 40 feeds the data to the slave unit 20, as in the previous embodiment. In response, the slave unit 20 forms a single communication slot and then sends it via the up-link as the sixth communication slot of a frame.

On receiving the slot from the client's terminal, the slave unit 10 of the server's terminal determines whether or not the received slot includes an error message. If the received slot does not include an error message, the slave unit 10 causes the number-of-slot setting 216 to increment the counter 218 to "2" while setting "2" in the TDMA processing 100. On receiving data from the data processing equipment 30, the slave unit 10 feeds the slot-by-slot data to the TDMA processing 100. As a result, two communication slots are continuously formed, demodulated, and then sent to the client's terminal.

At the client's terminal, the slave unit 20 again executes error checking with the two communication slots received and feeds the result of error checking to the controller 110 together with separated data. If the error rate of the two slots is lower than the threshold value, the data are transferred to the data processing equipment 40. Subsequently, one communication slot including data is sent from the data processing equipment 40 via the slave unit 20. If there are no data to be sent from the client's terminal, then the client's terminal sends, e.g., idle bursts in the same manner as in the previous embodiment.

On receiving the communication slot from the client's terminal, the slave unit 10 of the server's terminal again determines whether or not the slot includes an error message. If the answer of this decision is negative, the slave unit 10 increments the counter 218 and sets the resulting number of slots in the TDMA processing 100. Subsequently, the slave unit 10 constructs data fed from the data processing equipment 30 into three communication slots and sends them continuously.

Assume that a burst error, for example, occurs in the slot received by the client's terminal due to the deteriorated condition of a radio wave. Then, the client's terminal detects an error rate exceeding the threshold value as a result of error checking. In this case, the error message generation 220 generates an error message representative of an error and delivers it to the TDMA processing 100. In response, the TDMA processing 100 forms a communication slot including the error message at the timing assigned to the client's terminal and sends the slot to the server's terminal.

The server's terminal separates the error message from the received communication slot and feeds it to the message receipt 204. The message receipt 204 decodes the error message and determines that an error exceeding the threshold value has occurred in the previous slots sent from the server's terminal. The data processing section 210 informed of such an error by the message receipt 204 decrements the counter 218 and sets the resulting value in the TDMA processing 100. Then, the data processing section 210 delivers to the TDMA processing 100, e.g., only two of the three slots of data sent to the client's terminal previously. The TDMA processing 100 therefore forms two communication slots and sends them to the client's terminal.

At the client's terminal, the result of error checking executed with the two communication slots received is fed to the controller 110 together with separated data. If the error rate of the two slots is lower than the threshold value, the controller 110 transfers the received data to the data processing equipment 40. At the same time, the error message generation 220 generates a recovery message. If the two received slots still include an error, the error message generation 220 again generates an error message and feeds it to the TDMA processing 100. In response, the TDMA processing 100 forms a communication slot including the recovery message or the error message and sends it to the server's terminal.

On receiving the above communication slot from the client's terminal, the server's terminal separates the message and feeds it to the controller 110. The controller 110 determines, based on the message, whether the error has disappeared or whether it is still continuing. If the error has disappeared, the controller 110 causes the counter 218 to be incremented. If the error is continuing, then the controller 110 causes the counter 218 to be decremented. The resulting value of the counter 218 is set in the TDMA processing 100. The TDMA processing 100 forms the number of slots corresponding to the value of the counter 218 and sends them to the client's terminal.

In this manner, every time the server's terminal receives an error message from the client's terminal, it decrements the counter 218, sets the resulting number of slots in the TDMA processing 100, and sends the set number of slots of data to the client's station. When the server's terminal does not receive the error message or receives the recovery message, it sequentially increments the number of slots up to five frame by frame while setting the number in the TDMA processing 100. As a result, the number of slots of data set in the TDMA processing 100 are sent from the server's terminal to the client's terminal.

When the error message repeatedly appears, it is preferable to change the frequency channel by way of example. In this case, the server sends a message for changing the frequency channel to the client and cooperates with the client to set up synchronization via a new frequency channel in the same manner as at the time of call origination.

As stated above, in the alternative embodiment, the counter 218 is incremented or decremented by 1 for each frame and has its value set in the TDMA processing 100. Therefore, even when the conditions of a radio wave are deteriorated, the illustrative embodiment is capable of taking an adequate measure immediately. For example, when an error occurs, the illustrative embodiment allows the previous data to be again sent in the next frame. If the error continues, the illustrative embodiment can change the frequency channel immediately.

In the above embodiment, a communication slot to be sent from the client's terminal is positioned at the end of a frame. Alternatively, before the number of slots to be sent from the server exceeds three, the slot from the client may be sent half a frame later than the first slot of the server. When the number of server's slots exceeds four, the client's slot may be sent immediately after the server's last slot.

In the embodiments shown and described, to distinguish the server and client, the data processing equipment 30 and 40 respectively deliver ID codes to the associated PHS slave terminals 10 and 20, so that each slave unit 10 or 20 sends an ID message. Alternatively, if a particular slave unit is exclusively assigned the server and if the other PHS is connected to the client, whether the slave unit belongs to the server or to the client may be determined on the basis of the dial number of the slave unit.

Further, in the above embodiments, the slave units 10 and 20 are removably connected to the data processing equipment 30 and 40, respectively. If desired, each data processing equipment may be provided with the function of the slave unit in order to construct an integral PHS terminal.

In summary, in accordance with the present invention, a direct communication method between slave units and a PHS terminal form a plurality of consecutive slots in each frame and allow data to be interchanged via an up-link and a down-link asymmetrically, i.e., at different rates. This realizes efficient data communication when the up-link and down-link noticeably differ from each other in the quantity of data, e.g., at the time of data communication between a server and a client. Moreover, the method of the present invention implements a far higher data rate than the conventional method causing remote terminals to interchange one slot alternately.

The entire disclosure of Japanese patent application No. 143649/1998 filed on May 26, 1998 and including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A method of allowing two PHS (Personal Handy-Phone System) slave units respectively connected to two data processing equipment for data communication to directly communicate with each other via radio channels of TDMA (Time Division Multiple Access) frames, said method comprising the steps of:

connecting one of said data processing equipment functioning as a server for data communication to one of said PHS slave units, and connecting the other data processing equipment functioning as a client to the other PHS slave unit;

causing said PHS slave unit of the server to originate a call addressed to said PHS slave unit of the client via a desired communication channel and thereby setting up synchronization between said PHS slave units with respect to an up-link and a down-link via said communication channel;

setting, among m communication slots of a TDMA frame, n (natural number of 1 to m) consecutive communication slots continuing from a slot of said communication channel used for synchronization on at least the down-link extending from one of said PHS slave units to the other PHS slave unit; and causing said PHS slave terminals to interchange data at asymmetrical rates with respect to the up-link and the down-link in respective TDMA frames by respectively using some of the n slots and some of (m–n) slots.

2. A method in accordance with claim 1, wherein when the client calls the server, said PHS slave unit of said server once disconnects the channel and calls back said PHS slave unit of said client, whereby the radio channel extending from said PHS slave unit of said server to said PHS slave unit of said client is used as the down-link.

3. A method in accordance with claim 1, further comprising the steps of:

causing, after synchronization between said PHS slave units, said PHS slave units to interchange numbers of communication slots to set with each other by using a slow associated control channel of a communication channel, and causing, when a total number of communication slots to be set by said PHS slave units exceeds m, said PHS slave units to adjust said total number to at least less than m inclusive.

4. A method in accordance with claim 3, wherein each of said PHS slave units, after receiving each other's numbers of reserve slots, compare the number of reserve slot of the other PHS slave unit with a respective number of reserve slots, and sets of greater one of said numbers of reserve slots while causing the other PHS slave unit, smaller in the number of reserve slots, to set a remaining number of slots.

5. A method in accordance with claim 4, wherein when the numbers of reserve slots are equal or when priority degrees are equal, the number of slots of the server is set with a priority given thereto.

6. A method in accordance with claim 3, wherein information representative of a priority degree with respect to data transmission is added to the slow associated control channel, whereby the number of slots with a higher priority degree is set.

7. A method in accordance with claim 1, wherein the one PHS slave unit first sends one slot in an initial frame for data communication and then performs data communication by sequentially increasing the number of slots by one for each frame up to n slots.

8. A method in accordance with claim 7, wherein the other PHS slave unit sets at least one slot for a single frame and informs, when received data includes an error, the one PHS slave unit of said error by using said one slot, while said one PHS slave unit sends, until said error disappears, the slots by sequentially reducing the number of said slots by one for each frame and again increases, on disappearance of said error, the number of slots by one for each frame.

9. A method in accordance with claim 8, wherein the error or the disappearance of said error is represented by information added to a slow associated control channel of the communication slots.

10. A method as claimed in claim 8, wherein the other PHS slave unit sends the at least one slot as one of communication slots appearing at least half a frame later than the initial slot of the TDMA frame and after receipt of the n consecutive slots from the one PHS slave unit.

11. A method in accordance with claim 10, wherein the communication slot sent from the other PHS slave unit is a last communication slot of the TDMA frame.

12. A PHS terminal including a PHS slave unit and data processing equipment connected to said PHS slave unit for data communication, said PHS terminal comprising:

a continuous slot forming circuit for continuously forming, at least at a time of direct communication between said PHS slave unit and another PHS slave unit, a desired number of consecutive slots in a TDMA frame;

an identification message forming circuit for forming, when said PHS terminal calls another PHS terminal including said another PHS slave unit, a message for informing said another PHS terminal of whether said PHS terminal is a server or a client;

a callback control circuit for automatically redialing if said message shows that said another PHS terminal originated a call is a client;

a reserve message forming circuit for forming, based on a quantity of data to send, a reserve message representative of a number of slots to reserve in one frame; and a number-of-slot setting circuit for comparing, on receiving the reserve message from said another PHS terminal, the number of reserve slots represented by said reserve message and a number of reserve slots of said PHS terminal and setting, based on a result of comparison, a number of slots to be sent from said PHS terminal for a frame in said continuous slot forming circuit.

13. A PHS terminal in accordance with claim 12, wherein said reserve message forming circuit includes a priority degree setting circuit for setting in a slow associated control channel of a priority degree of data transmission together with the number of reserve slots.

14. A PHS terminal in accordance with claim 13, wherein said number-of-slot setting circuit sets the number of slots in said continuous slot forming circuit on the basis of the number of reserve slots of said another PHS terminal and the number of reserve slots of said PHS terminal and priority degrees.

15. A PHS terminal in accordance with claim 12, wherein said number-of-slot setting circuit gives priority to the number of slots of the server when the numbers of reserve slots are equal or when the priority degrees are equal.

16. A PHS terminal in accordance with claim 12, wherein said number-of-slot setting circuit includes a counter for setting one slot in an initial frame for data transmission and then sequentially increasing the number of slots for each frame up to n reserved slots while setting said number of slots in said continuous slot forming circuit.

17. A PHS terminal in accordance with claim 16, wherein said counter sequentially reduces the number of slots by one slot for each frame in response to an error message representative of an error included in transmitted data and received from said another PHS terminal, and again sequentially increasing the number of slots in response to a recovery message representative of disappearance of said error and also received from said another PHS terminal.

18. A PHS terminal in accordance with claim 12, wherein said PHS terminal belongs to a client and further comprises an error message reporting circuit for setting at least one slot in a frame and forming a message for reporting an error included in received data by using said at least one slot.

19. A PHS terminal in accordance with 18, further comprising a slot forming circuit for forming said at least one slot as one of communication slots appearing at least half a frame later than the initial slot of the TDMA frame and after a receipt of n consecutive slots from the server.

* * * * *